J. BRAUN.
Machines for Making Machine-Screws.
No. 138,067.
2 Sheets--Sheet 1.
Patented April 22, 1873.
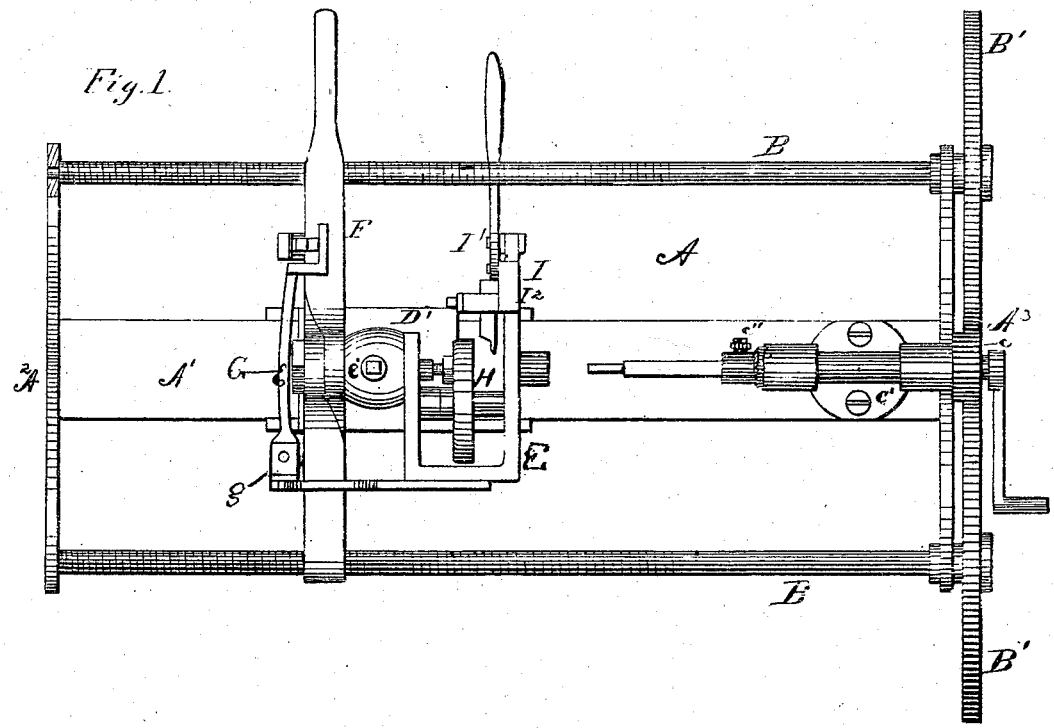
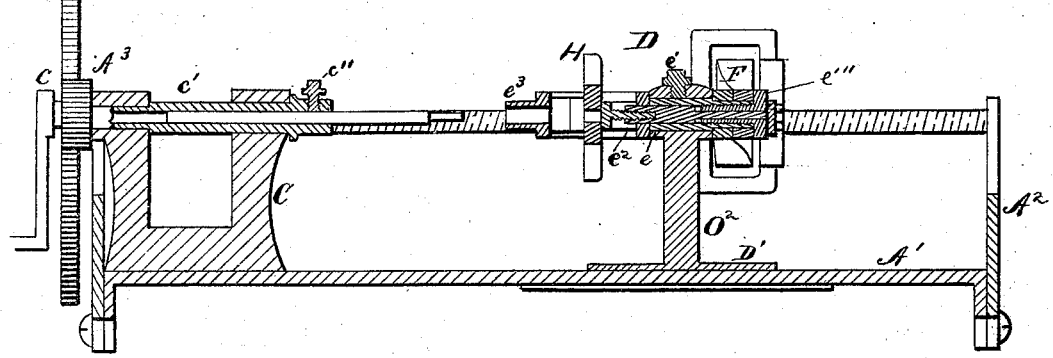
Witnesses:
E. M. Bates.
Geo. E. Upham,
Inventor:
John Braun,
Chipman Hosmer & Co.
Attorneys.

2 Sheets--Sheet 2.

J. BRAUN.
Machines for Making Machine-Screws.

No. 138,067. Patented April 22, 1873.

Witnesses:
E. A. Bates.
Geo. E. Upham,

Inventor:
John Braun,
Chipman Hosmer & Co,
Attys.

UNITED STATES PATENT OFFICE.

JOHN BRAUN, OF PHILADELPHIA, PENNSYLVANIA, ASSIGNOR TO GOODELL, BRAUN & CO., OF SAME PLACE.

IMPROVEMENT IN MACHINES FOR MAKING MACHINE-SCREWS.

Specification forming part of Letters Patent No. 138,067, dated April 22, 1873; application filed January 4, 1873.

*To all whom it may concern:*

Be it known that I, JOHN BRAUN, of Philadelphia, in the county of Philadelphia and State of Pennsylvania, have invented new and valuable Improvements in Machines for Making Set-Screws; and I do hereby declare that the following is a full, clear, and exact description of the construction and operation of the same, reference being had to the annexed drawing making a part of this specification, and to the letters and figures of reference marked thereon.

Figure 3:
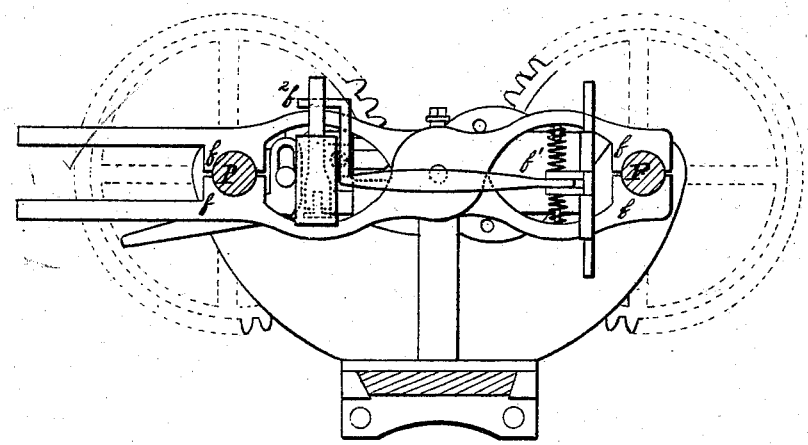
Figure 4:
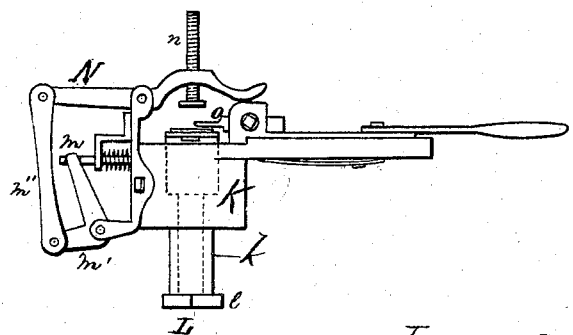

Figure 1 of the drawing is a representation of a plan view of my machine. Fig. 2 is a longitudinal section of the same. Figs. 3 and 4 are details of the same.

My invention has reference to machines for making set-screws; and it consists in the novel construction, combination, and arrangement of parts, as hereinafter fully described.

The bar or rod of iron which it is designed to convert into screws is made fast at one end in a hollow shaft mounted on a fixed arbor. The other end of the bar is operated upon by a device I call the feeder, which, as the bar becomes shortened as the screws are cut from it, moves toward the arbor. By this means the bar, being once adjusted in place, remains fixed until the last screw has been cut from it.

When headed set-screws are to be made the feeder is drawn to and from the arbor by a pair of tongs, which work in gear with worm-shafts, and the square bar used is milled or rounded and threaded the requisite length by dies for that purpose, the feeder being drawn back by a reverse motion of the worm-shafts, so as to permit the die to be changed. There is a gage employed, by which the length of the screws is regulated, and as soon as the required length has been attained, both in milling and threading, the tongs are automatically thrown out of gear with the worm-shafts, and the feeding ceases, when the tool is brought into position and the screw cut from the bar.

In making headless set-screws, a round bar of iron is employed. This bar being duly adjusted in place, its end enters a threading-die arranged on a hollow shaft on the feeder, and the working of this on the bar draws the feeder toward the arbor without employing the tongs or worm-shaft. When the bar has been threaded the proper length, its end comes in contact with a gage, which, upon being pressed back by the bar, actuates a lever connected to a spring-plunger that enters a recess in the shaft on which the die is mounted. The movement of the lever raises the plunger, allowing the die-shaft to rotate with the bar, and thereby stopping the feeding and threading operation. The tool is then brought to bear; the screw is cut off and drops; the lever and gage resume their position; the plunger enters the shaft, and the threading goes on, as before.

In the drawing, Figs. 1 and 2 show the frame of the machine, provided with a base-piece, $A^1$, and ends $A^2$ $A^3$, which afford bearings for the worm-shafts B B, upon which are mounted the gear-wheels B' B'. C represents a plumber-block, made fast to the base-piece $A^1$, supporting the hollow shaft $c'$, to which rotary motion is communicated by suitable means, preferably by a belt compassing said shaft between the arms of the plumber-block C. The shaft $c'$ bears a pinion, $c$, by which motion is communicated to the gear-wheels B' B', and said shaft is made hollow, so as to permit the passage of the bar from which the screws are made. When a suitable length of the bar has been passed through the shaft it is made fast by means of the set-screw $c''$.

When headed screws are to be made, a square bar of metal is passed through the shaft $c'$, and is milled or rounded, threaded, and cut by the means now to be described.

D, in Figs. 1 and 2, represents the device I term a feeder, composed of the slide D', which moves forward and back upon the base-piece $A^1$, and the standard $O^2$, supporting the tongs, dies, and cutter. The standard $O^2$ is provided with an opening, through which passes a sleeve, $e$, projecting from the frame E, and secured from turning by the set-screw $e^1$. The tongs F are mounted and turn upon the outer end of the sleeve $e$, and are held by the hollow bolt $e'''$, which is screwed into said sleeve $e$. The sliding shaft $e^2$, provided with a screw-head for gaging purposes, passes through the sleeve e and hollow bolt c'''. The tongs are provided with threaded studs f, which gear with the worm-shafts B B, and their jaws are kept apart by the coiled spring $f^1$, when not locked by the spring-latch $f^2$. G is a lever, pivoted to the frame E at g, so that when the sliding rod $e^2$ is pressed against said lever it will cause it to throw back the latch $f^2$, permitting the tongs to open their jaws. H is a disk, revolving loosely upon its shaft, but which may be made fast by a plunger (not illustrated) fastened to the frame E, and arranged to enter suitable notches or recesses in the periphery of said disk. This disk contains the dies by which the rod to be converted into screws is rounded or milled and threaded. The cutting-tool is shown at I, being provided with an elbow-lever, $I^1$, and block $I^2$, which slides upon the frame E.

The operation of the machine thus arranged is as follows: The feeder D is drawn back as far as the length of the machine will permit, and a bar of iron passed through the shaft c' until the end of said bar, going through the collar $e^3$ upon the frame E, meets the milling-die in the disk H, the bar being then duly fastened in place by means of the set-screw c''. Power being applied, the shaft c' is caused to turn, communicating motion to the worms B B, by which the feeder (the tongs F being locked) is drawn toward the plumber-block C. The bar passes through the milling-die, and is duly rounded until its end, coming in contact with the end of the sliding shaft $e^2$, presses the same against the lever G, which throws back the latch $f^2$, causing the jaws of the tongs to open and the feeding to cease. The motion of the shafts is then reversed, the tongs being again brought into gear and locked, whereby the feeder is drawn back until the end of the bar leaves the milling-die. The disk H is then turned to bring the threading-die into position, when the motion of the shafts is again reversed, advancing the feeder and forming the thread. When the end of the bar meets the shaft $e^2$ the jaws of the tongs separate, as before, and the feeding and threading cease. The shaft c' continues, however, to rotate, carrying with it the threaded bar, against which the tool is then brought to bear, cutting off the threaded portion, together with a sufficient length of the square part of the bar to form a head for the screw. The screw being cut from the bar drops into a suitable receptacle and the operation is repeated, as described.

The same machine, modified as I shall now describe, may be adapted to making headless set-screws: The frame has the base-piece $A^1$ and ends $A^2$ $A^3$, with the plumber-block C and hollow shaft c' and set-screw c''. The feeder D, composed of the slide D' and standard $O^2$, is constructed as already described. The frame E with the cutting-tool, the disk holding the dies, and the tongs are removed, and I apply instead the devices illustrated in Fig. 4. These are made up of a central piece or block, K, having an arm upon which the cutting-tool is mounted, a hollow shaft fitting in the block K and bearing-die, and a spring-plunger and its levers, as hereinafter fully described. The block K has a stem or collar, k, which passes through the opening in the standard $O^2$, and through both block and collar passes a hollow shaft, L, which has a nut, l, at one end and a threading-die at the other. m is a spring-plunger, which passes through the block K and enters a recess in the shaft L, this plunger being connected by means of the elbow m' and pitman m'' with the lever N, which bears the screw-gage n. The hollow shaft L is prevented from turning while the thread is being made by means of the spring-plunger m. As soon, however, as the requisite length of thread has been formed, the end of the bar which is being operated upon comes in contact with the gage n, pushing back the lever N and causing the plunger to be withdrawn from the shaft L, which thereupon rotates with the bar. The tool o is then brought to bear against the bar, cutting off the threaded portion thereof, which falls, allowing the lever N to resume its former position and the plunger m to re-enter the recess in the shaft L, when the threading operation again goes on. The plunger m may also be withdrawn by raising the handle of the cutting-tool, thereby sliding the beveled edge of the rest which holds the tool against the lever N, pressing back said lever and causing the plunger to rise.

It will thus be seen that with a machine constructed according to my invention I am enabled to use a bar of great length, and said bar being once fixed in place remains undisturbed until the last screw is cut from it; besides, the arrangement of the devices is such that when the required length of bar has been threaded the feeding ceases, thereby obviating any danger that might otherwise result from the inattention of the person in charge of the machine.

What I claim as my invention, and desire to secure by Letters Patent, is—

1. In combination with the worm-shaft B B, the feeder D, substantially as shown and described.

2. The tongs F, constructed and arranged substantially as set forth.

3. In combination with the tongs F, the sliding shaft $e^2$ for automatically unlocking said tongs, as described.

4. The combination of the hollow revolving shaft c', the worm-shafts B B, the tongs F, sliding shaft $e^2$, and frame E bearing the cutting-tool and die-disk, substantially as described.

5. In combination with the block K and shaft L, the plunger m, substantially as shown.

6. In combination with the plunger m, the lever N, substantially as described.

7. In combination with the shaft L, arranged to operate as shown and set forth, the hollow shaft c', as shown.

8. The combination of the block K, shaft L, plunger $m$, and lever N, substantially as shown and set forth.

9. The combination of the base-piece $A^1$, slide $D'$, and standard $O^2$ with the frame E, having the die-disk and cutting-tool, and the tongs F.

10. The combination of the base-piece $A^1$, slide $D'$, and standard $O^2$ with the block K, shaft L, plunger $m$, and lever N.

In testimony that I claim the above I have hereunto subscribed my name in the presence of two witnesses.

JOHN BRAUN.

Witnesses:
A. W. GOODELL,
M. DANL. CONNOLLY.